United States Patent [19]

Bulman

[11] Patent Number: 5,327,721
[45] Date of Patent: Jul. 12, 1994

[54] EJECTOR RAMJET

[75] Inventor: Melvin J. Bulman, Folsom, Calif.

[73] Assignee: Aerojet-General Corporation, Rancho Cordova, Calif.

[21] Appl. No.: 950,869

[22] Filed: Sep. 24, 1992

Related U.S. Application Data

[63] Continuation of Ser. No. 715,291, Jun. 14, 1991.

[51] Int. Cl.⁵ .............................................. F02K 7/12
[52] U.S. Cl. ...................................... 60/269; 60/270.1
[58] Field of Search .............. 60/231, 264, 269, 270.1; 417/174, 182, 187; 137/825, 826, 842

[56] References Cited

U.S. PATENT DOCUMENTS

| | | | |
|---|---|---|---|
| H1007 | 1/1982 | Schadow et al. | 60/270.1 |
| 3,046,732 | 7/1962 | Foa. | |
| 3,143,856 | 8/1964 | Hausmann | 60/231 |
| 3,279,185 | 10/1966 | Lewis et al. | 60/231 |
| 3,357,191 | 12/1967 | Berner. | |
| 3,925,982 | 12/1975 | Mueller. | |
| 4,030,289 | 6/1977 | Kampe | 60/269 |
| 4,257,224 | 3/1981 | Wygnanski | 60/204 |

FOREIGN PATENT DOCUMENTS

757496 9/1956 United Kingdom.
2184786A 7/1987 United Kingdom.

OTHER PUBLICATIONS

Newton, Jr. et al., "Experiments on the Interaction of Secondary Injectants and Rocket Exhaust for Thrust Vector Control", *Jet Propulsion Laboratory, California Institute of Technology* (1962).

*Primary Examiner*—Louis J. Casaregola
*Attorney, Agent, or Firm*—Townsend and Townsend Khourie and Crew

[57] ABSTRACT

An improved ejector ramjet includes a nozzle and propulsion duct. The nozzle has first and second sides, which are preferably two-dimensional, and produces a primary fluid jet which causes secondary fluid to be entrained in the propulsion duct. The primary jet is oscillated providing energy exchange between the primary and secondary fluids in the propulsion duct in a substantially non-viscous fashion.

10 Claims, 4 Drawing Sheets

EJECTOR RAMJET

This application is a division of application Ser. No. 715,291, filed Jun. 14, 1991.

BACKGROUND OF THE INVENTION

The present invention relates generally to ramjet propulsion devices, more particularly to ramjets having secondary fluid induction systems, such as ejectors.

A "ramjet" is a jet engine in which a fuel is combusted, having in its forward end a continuous inlet of air that depends on the speed of flight rather than on a mechanical compressor, for the compressing effect produced on the air. In ramjet powered missiles and other high performance systems, the need is to accelerate the vehicle from 0 or low velocity to a velocity where a ramjet will begin to operate on its own (Mach number about 2-3). The problem with the conventional ramjet is its inability to produce thrust at low speed. One solution is to use a turbojet or other conventional jet to get the vehicle moving initially; however, once the vehicle is moving at a velocity sufficient for the ramjet to operate, the turbojet is simply dead weight for the rest of the mission (unless it is discarded). Therefore, most ramjet-powered missiles use a rocket to accelerate to the initial velocity, although the use of rockets is very inefficient. Because it is small and compact, the rocket is attractive for use because it can be discarded. This is acceptable for some missions; however, for missions where the vehicle has other constraints such as internal stowage on the launcher the size and weight of the rocket motor becomes disadvantageous. If the rocket is integrated into the system and made to operate more like a jet engine (i.e., made so that it works with a secondary fluid (i.e., air)) the propulsion efficiency of the entire system can increase. The air-breathing action in low velocity flight is typically considered as augmentation to the rocket thrust, and is referred to as an ejector rocket or air-augmented rocket.

An "ejector" is a jet pump for withdrawing a secondary fluid from a space by movement of a primary fluid. When an ejector is combined with a ramjet as shown in FIG. 1, an "ejector ramjet" 10 is produced. Shown are a rocket 12, ejector 14, diffuser 16, combustor 18, and nozzle 19. The rocket 12 produces a primary exhaust jet 20, inducing secondary fluid 22 (typically air) into the ejector ramjet engine 10. A frictional shear boundary is shown at 24 between primary and secondary fluids.

The ejector ramjet has an advantage over the conventional ramjet in that the ejector ramjet can produce thrust at zero speed while the latter cannot. One disadvantage of the ejector ramjet is that its efficiency is not significantly better than the rocket-driven primary alone. Therefore, it would be advantageous to design a more efficient ejector ramjet to take advantage of its generation of thrust at zero speed characteristic while increasing its efficiency.

Rockets and jets follow momentum rules:

$$F = thrust = \dot{M}_e V_e - \dot{M}_i V_i + (P_e - P_a) A_e$$

where
- A = area (ft$^2$)
- $\dot{M}$ = mass flow rate (slugs/sec)
- P = pressure (lb/ft$^2$)
- V = velocity (ft/sec)
- a = ambient
- e = exhaust
- i = intake In static jets, the last two terms can be neglected so that $F = \dot{M}_e V_e$. The input energy (E) expended to achieve the thrust is then $$E = \tfrac{1}{2} \dot{M}_e V_e^2 \times 1/n_c$$

where $n_c$ = combined internal efficiency including combustion and thermodynamic efficiency If $n_c$ is assumed constant and the input energy is constant, i.e., primary flow is constant, F is maximized by increasing $M_e$:

$$F = \dot{M}_e V_e$$

$$F = (2 n_c \dot{M}_e E)^{\frac{1}{2}} = K(\dot{M}_e)^{\frac{1}{2}}$$

On the face of this system it would seem that thrust would be increased since $\dot{M}_e$ is increased, thus increasing the propulsive efficiency of the system. The problem is that the kinetic energy of the rocket exhaust is not being equally shared among all of the fluids since the method of inducing increased air flow is frictional. Viscous shear is very inefficient for transferring energy. The rocket placed in the duct in this fashion has a very high exhaust velocity (roughly 10,000 ft/sec or more) but the air flow that is induced or pumped in can only be accelerated to about 1,000 ft/sec at 0 or relatively low vehicle speeds. This difference in velocity between the primary jet and secondary fluid does transfer momentum by shear force, but the work done on the secondary fluid (F.V$_s$) is much less than the work removed from the primary fluid (F.V$_p$). The balance of the energy is lost as heat. Since momentum is conserved, a situation occurs wherein momentum is transferred but little thrust augmentation is achieved, as energy transfer efficiency is only about 10%. Consequently, the assumption made above, that $n_c$ may be assumed constant, does not hold true at static conditions.

It would be advantageous if energy could be transferred more efficiently in thrust augmentation systems utilizing rockets which entrain secondary fluids, especially at 0 or very low vehicle velocities. Foa, in U.S. Pat. No. 3,046,732, compares methods of transferring mechanical energy from one flowing fluid to another flowing fluid, discussing both direct and indirect methods. Direct transfer of energy is exemplified by the highly inefficient ejector system discussed above, while indirect systems include turbomachinery, for example, the turbojet. The third type described is the direct nonsteady-flow transfer of energy by pressure waves. Berner, in U.S. Pat. No. 3,357,191 describes a combination of the "pseudo-blades" produced by the Foa system and the wave tube system, where a plurality of wave tubes downstream of the pseudo-blades is provided. Other possible relevant patents include Wygnanski et al., U.S. Pat. No. 4,257,224, who describe a mixing device which is driven to induce oscillations of two fluids about an axis normal to the mixing region flow axis, and Mueller, U.S. Pat. No. 3,925,982, who describes a fluid-dynamic shock ring for controlled flow separation in a rocket engine exhaust nozzle.

SUMMARY OF THE INVENTION

In accordance with the present invention, nonsteady flow of a primary fluid, when used in a periodic or oscillating fashion, may be applied to a propulsion system to increase the propulsive efficiency of the system. This may be achieved by causing one or more primary jets in a propulsion duct to be deflected by locally separating the jets from their nozzles, thereby increasing the energy transfer between the fluids. The primary jets are separated from their nozzles by a fluid injected on one side of the nozzle, much as is done in the thrust vector control of ballistic missiles. The separation can be fluidically driven by using an amplifier set at a frequency which allows the jet to be alternately separated from one side to the other so that the jet oscillates from side-to-side at a predetermined frequency.

In one embodiment of the invention, an improved ejector ramjet comprises a nozzle having a first side and a second side, the nozzle producing a primary fluid jet and an entrained secondary fluid jet; a propulsion duct through which the primary fluid jet and secondary fluid jet flow; and means for alternately separating the primary fluid jet from the first and second sides of the nozzle, thereby linearly oscillating the primary jet and entrained secondary flow in the propulsion duct. In one exemplary embodiment, the nozzle(s) is external to the propulsion duct, and the means for alternately separating the primary fluid jet includes first and second fluid injectors, the two fluid injectors positioned in first and second sides of a delaval nozzle, respectively. In this configuration, the propulsion duct preferably comprises a plurality of rectangular cross section tubes positioned downstream from the nozzle(s) for alternately receiving primary fluid and entrained secondary fluid.

In a second exemplary embodiment, the improved injector ramjet comprises a nozzle, propulsion duct, and means for alternately separating the primary fluid jet, as in the first embodiment, with the change in configuration being that the nozzle(s) is internal to the propulsion duct. In this configuration, the ejector ramjet further comprises a duct positioned upstream of the nozzle(s), the upstream duct having a length with a natural tuning frequency in which a hammer shock and reflected expansion wave may resonate when properly tuned. This embodiment preferably further includes means for controlling oscillation of the primary jet wherein the oscillation of the primary jet is tuned to the natural frequency of the upstream duct.

In a third embodiment, multiple primary nozzles are installed in a common duct. The primary jets emerging from these nozzles are deflected in opposed fashion so as to close off and open up the secondary flow path. In all three embodiments, the linear oscillation of the primary jet(s) creates a nonsteady interaction between the flows. This interaction between a high-speed and low-speed fluid produces the effect known as wave dynamic pressure exchange. This process has been used successfully in such devices as the Comprex. In this process, when the fluids are initially brought together with the faster fluid behind the slower, the faster fluid is decelerated and the slower fluid accelerated. This velocity change, produced by shocks in the respective fluids, raises the pressure in both fluids. FIGS. 2a and 2b illustrate this process in a simple one-dimensional, nonsteady flow system. FIG. 2a represents the process in space and time when a fast fluid 1 overtakes a slower fluid 4. The fluids first come in contact at point A. The contact occurs within the confines of a duct such that the fluids are prevented from moving laterally. (This condition is referred to as "one dimensional flow.") Under these conditions, the faster fluid 1 must be decelerated and the slower fluid 4 accelerated until they are moving at the same velocity. Both fluids experience an increase in pressure due to the velocity change. In this situation, these pressure increases are produced by shock waves in each of the flows. A primary shock 6 decelerates the fast fluid 1 and increases its pressure. The fluid processed by the primary shock is labeled fluid 2. The slow fluid 4 is likewise processed by a secondary shock 8 producing fluid 3, which has been accelerated and pressurized. A contact surface 7 exists between fluids 2 and 3. This contact surface 7 separates fluids which may have different gas species and temperatures, but must share the same velocity and pressure.

To better illustrate this process, an example is presented. The high velocity fluid 1 is approaching at 7376 ft/sec at 12.75 psia and represents rocket exhaust gas. Fluid 4, representing air, approaches the interaction zone at 1973 ft/sec at 2.49 psia. As these gases pass through their prospective shocks, they experience a change in velocity and pressure. In FIG. 2a, the velocities are represented by the slope of the streamlines with a vertical line representing zero velocity (no distance change with time). A horizontal line represents infinite velocity (no time to go any distance).

Since both fluids are trying to occupy the same space, they are both compressed. The compression each experiences depends on the respective densities and velocity changes. The compressed fluids are labelled 2 and 3. FIG. 2b plots the pressure change for the example gases as a function of the interface velocity. These plots cross at 4825 ft/sec. At this interface velocity, the pressure in fluid 2 is equal to the pressure in fluid 3, which for this example is 47.5 psia. Approximately 30 to about 50% of the energy formerly lost in the shearing process as heat has now been retained as pressure energy of the exhaust gases, leading to greater thrust augmentation, even at static conditions. Optionally, a combustion chamber may be added after the propulsion duct to produce even more thrust, since the pressure of the gases is now higher, and an injected fuel would combust and produce greater thrust.

The thrust augmentation possible is somewhat dependent on tuning the process. The upstream duct in which the hammer shock travels and is reflected has a natural frequency. Further, there is a control frequency for the alternate separations of the primary fluid in the primary nozzles. The ability to synchronize these two frequencies will determine the actual percentage of thrust augmentation. Thus, the length of the upstream duct (from the nozzle exit back to the divergent portion of the upstream duct) is very important. A variably tuned controller which receives signals from the upstream and downstream pressures to control the alternate separations of the primary jet is an exemplary embodiment, since the tuning requirements will change as flight conditions change (primarily vehicle velocity). Ideally, however, the process is passively tuned, i.e., the hammer shock and primary oscillation resonating may allow the system to be self-driven without the fluidically driven fluid injectors and associated controls. This specifically tailored geometry of the upstream duct creates the desired physical effect of self-driven oscillation of the primaries.

These and other aspects of the present invention will be more fully understood in light of the specific embodiments and description set forth below:

DESCRIPTION OF PREFERRED EMBODIMENTS

Figure 1:
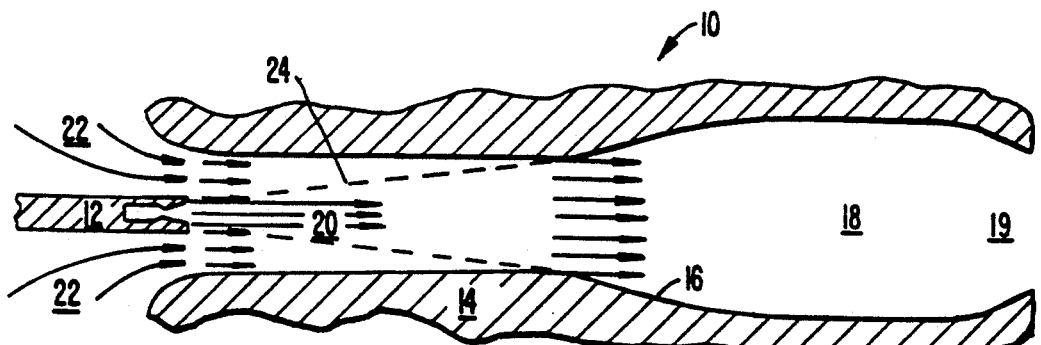
FIG. 1 shows a schematic sectional view of a conventional ejector ramjet.
Figure 2A:
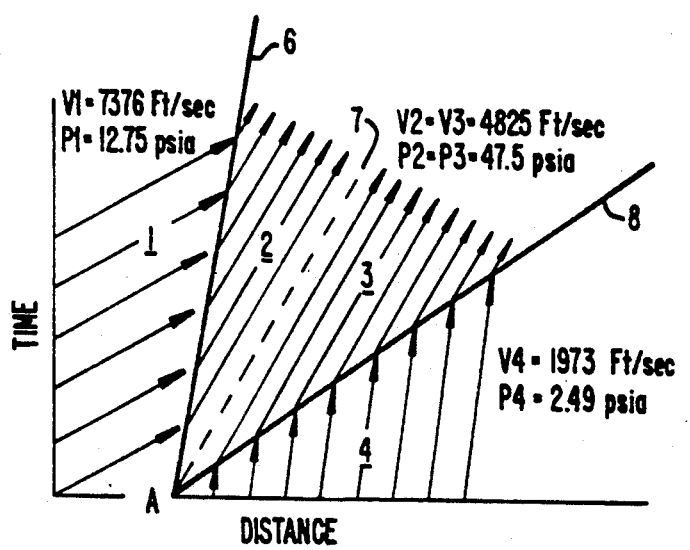
FIGS. 2a-b illustrate wave dynamic pressure exchange between fast- and slow-moving fluids.
Figure 2B:
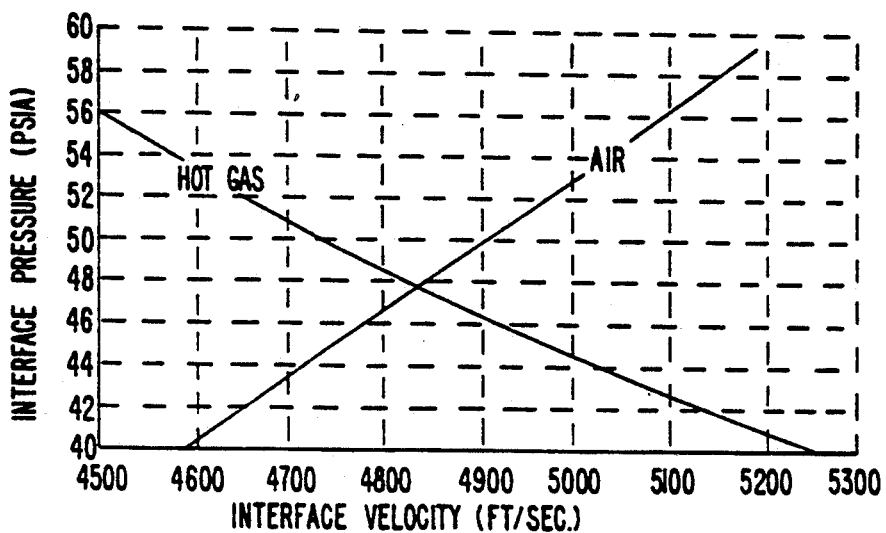

The improved ejector ramjet of the present invention will now be described with reference to FIGS. 3-6. When comparing the fluid processes of these embodiments with a conventional ejector ramjet as shown in FIG. 1, one will observe the same velocity at the exit of the mixing section but the static pressure at exit will range from about two times to about four times as great as that of the conventional ejector ramjet. This can result in a significant thrust increase at static conditions, and, at high speeds, the improved ejector ramjet engine can produce significant mixing improvements over conventional ramjet and scramjet engines.

Figure 3:
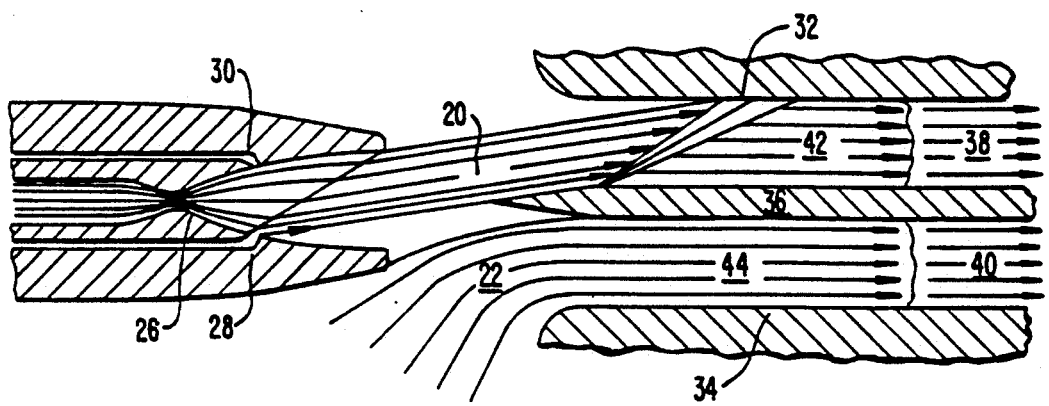
FIG. 3 shows a schematic of the oscillating external driver embodiment of the present invention.

Referring now specifically to the embodiment shown in FIG. 3, an oscillating external primary jet 20 is shown exiting the primary nozzle 26. Nozzle 26 is preferably a two-dimensional nozzle, having side panels which include fluid injectors 28 and 30, respectively. Fluid injectors 28 and 30 operate to alternately separate the primary jet 20 from opposite sides of nozzle 26. The fluid used to drive the primary jet back and forth can be any fluid, for example, liquid or gaseous fuels, or ram air. Any fluid having a higher pressure than the local nozzle pressure may be utilized for producing the oscillation of the primary jet. The fluid injectors or deflectors 28 and 30 are preferably controlled by a feedback control system which senses engine exhaust pressure as well as inlet pressure, and informs the deflectors of the frequency for alternating the primary jet from side to side. The frequency of primary jet oscillations may vary over a broad range depending on duct geometry, vehicle speed, etc. The frequency of primary jet oscillation may range from about 1 Hertz up to 100 Hertz or more depending on the engine size.

Sidewalls 32 and 34 of the propulsion duct direct alternating slugs of primary and secondary fluid into separate downstream channels or tubes created by partition 36. Thus, as shown in FIG. 3, primary fluid 20 is shown entering the upper duct section bounded by wall 32 and barrier 36, while secondary air 22 is shown entering the lower duct bounded by wall 34 and barrier 36. Shown at 38 is a preceding slug of secondary fluid while shown at 40 is a preceding slug of primary fluid. Primary fluid 40 draws secondary fluid slug 44 into the lower duct by creating a partial vacuum behind it while primary fluid slug 42 pushes secondary flow slug 38 into the upper portion of the propulsion duct. By alternating the separation of the primary jet 20 from the two-dimensional nozzle via the fluid injectors 28 and 30, the primary and secondary fluids may contact each other in the respective ducts in such fashion as to transfer energy in a nonviscous, substantially frictionless manner (wave dynamic pressure exchange).

The nozzle 26 and fluid injectors 28 and 30 used in the improved ejector ramjets of the present invention are commercially available and are described in various sources; one method of controlled flow separation of the primary fluid from a nozzle is found in Mueller, U.S. Pat. No. 3,925,982, which shows a "fluid-dynamic shock ring" that forces the primary fluid boundary layer to separate uniformly from the nozzle wall. More directly applicable to our invention is Jet Propulsion Laboratory Technical Report No. 32-203, "Experiments on the Interaction of Secondary Injectants on Rocket Exhaust for Thrust Vector Control," J. F. Newton, Jr., and F. W. Spaid, Feb. 12, 1962. In this report, the exhaust jet is deflected by the asymmetrical fluid injection as in our case.

The propulsion duct formed by sidewalls 32 and 34 and barrier 36 must be of sufficient length to produce the thrust augmentation required of the ejector ramjet. In general, the length of the propulsion duct will be sufficient to allow the primary and secondary fluids to interact such that the secondary fluid is supersonically compressed and accelerated and experiences viscous acceleration, which, however, is less than in typical ejector ramjet engines. The propulsion duct is any shape that will integrate well with the balance of the vehicle. Preferably, the propulsion duct has a rectangular cross section to conform with hypersonic vehicle designs currently in use.

As previously stated, the linear oscillation frequency of the primary jet preferably ranges from about 1 Hertz to about 100 Hertz or more, the upper limit depending on the size of the engine. In the improved ejector ramjets of the present invention, the design of the primary jet nozzle preferably has a configuration which avoids requiring great force to separate the primary jet from one side of the primary nozzle.

As the primary jet is oscillated in the primary nozzle, oscillatory motions may dampen in amplitude as the oscillation proceeds (dynamically stable) or may grow and diverge (dynamically unstable). The degree of dynamic stability, determined by the frequency of oscillation and the geometry of the propulsion duct, will determine the input power required to sustain the oscillation at the desired amplitude.

Figure 4:
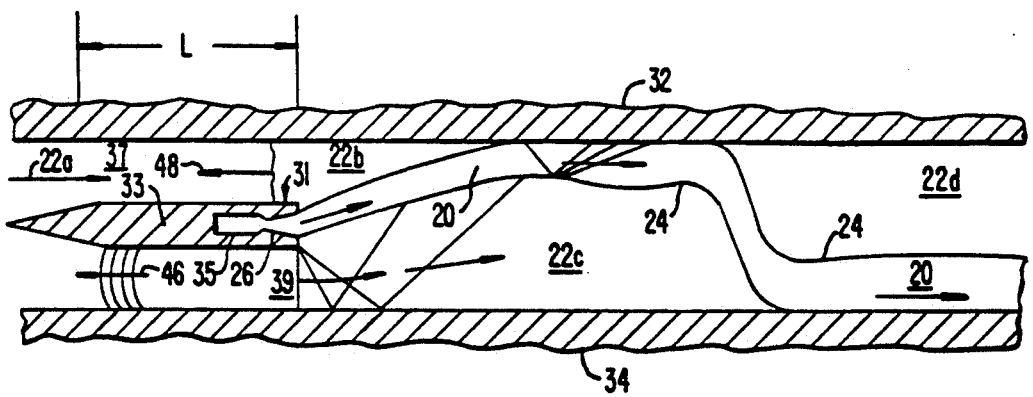
FIG. 4 shows a schematic of the oscillating internal driver configuration showing a single primary jet.

A second embodiment of the improved ejector ramjet is shown in FIG. 4 wherein ejector strut 31 is shown as including strut portion 33, which houses or forms gas source 35 (such as a rocket combustion chamber) and nozzle 26, as is conventional in the art. Nozzle 26 is shown internal to the propulsion duct as bounded by walls 32 and 34. Nozzle 26 produces a primary jet 20 which induces a secondary fluid 22a to flow into the space bounded by walls 32 and 34. This configuration produces more complicated fluid mechanics from the embodiment shown in FIG. 3, but is more efficient than the external driver embodiment. The linear oscillation of the primary jet produces alternate hammer waves, denoted as 48, and expansion waves 46 in each upstream duct 37 and 39, as the primary jet is switched from side to side by fluid injectors (not shown for clarity). The secondary fluid flow at 22a is a sonic-induced inflow into the ejector ramjet engine. The secondary fluid at 22b is experiencing a hammer compression, roughly doubling the total pressure up to about two atmospheres. The primary jet 20, having been forced away from the lower duct wall 34, produces a supersonic acceleration of the secondary fluid at 22c, which is actually a suction wherein the pressure drops below atmospheric in the secondary fluid. The secondary fluid in the location shown as 22d is also supersonically accelerated. However, it is undergoing compression such that it is both supersonic and at a pressure greater than one atmosphere. At the boundary or interface 24 between the primary flow 20 and various portions of secondary fluid 22, the secondary fluid undergoes viscous acceleration and mixing, similar to, but less than that noted in the conventional ejector ramjet situation.

As noted previously, the oscillation of the primary jet will produce alternate hammer and expansion waves in each upstream duct. If the primary jet oscillation frequency is tuned to the "organ pipe" frequency of the upstream ducts, two benefits may be achieved. The hammer wave and its reflection can be used to trigger the deflection of the primary jet 20 away from alternate sidewalls of the nozzle at 32 and 34. This will have the effect of reducing the fluidic power required to separate the primary fluid using fluid injectors 28 and 30 shown in FIG. 3 (not shown in FIG. 4 for clarity). This triggering of the deflection of the primary jet may also preferably allow the system to be self-driven at resonance. The hammer wave 48 can produce significant precompression of the induced air flow (total pressure may approximately double even prior to contact between the flows). Downstream of the primary nozzle 26, further compression and acceleration of the secondary flow occurs. When the primary jet 20 switches sides in response to the hammer wave 48 and the fluidic source 28 or 30 (if still required), a secondary flow is "released" from side wall 32 or 34, respectively. Once released, the secondary flow accelerates into the cavity formed by the shifting primary. This cavity moves away from the primary nozzle with velocity on the order of about 50% of the primary jet velocity. The secondary flow at 22c accelerates to a supersonic velocity to fill this cavity (reducing shear losses). When the primary jet 20 is switched back, this low pressure, high velocity, secondary flow slug is sealed off and surrounded by the primary fluid. The "fresh" primary fluid at the rear of the secondary slug is moving faster than the primary fluid 20 at the front of the slug. This interaction produces further acceleration and compression of the secondary flow 22c and 22d. Throughout the whole process, downstream of the nozzle, viscous shear and mixing between primary and secondary fluids will also be taking place. The viscous effects will be reduced due to the lower relative velocities of flows of primary fluid 20 and secondary fluid 22 and the mixing of the two fluids will be enhanced due to the macroscopic mixing of the two flows.

Comparing the fluid process of the embodiment of FIG. 4 with that of the conventional ejector ramjet of FIG. 1, it will be observed that approximately (within 5%) the same velocity is found at the exit of the mixing section, but the static pressure increases from about two to about four times over that of the conventional ejector ramjet.

Figure 5A:
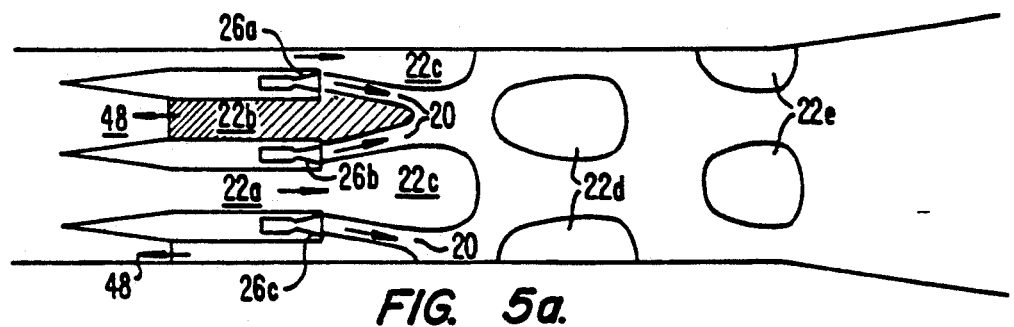
FIGS. 5a-d show schematically time-lapse views of a "bubble" of secondary fluid as it passes through the improved ejector ramjet having multiple primary nozzles in accordance with another embodiment of the present invention.
Figure 5B:
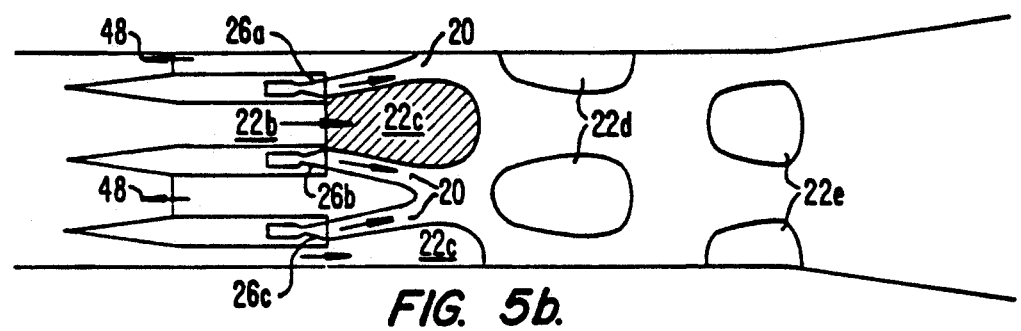
Figure 5C:
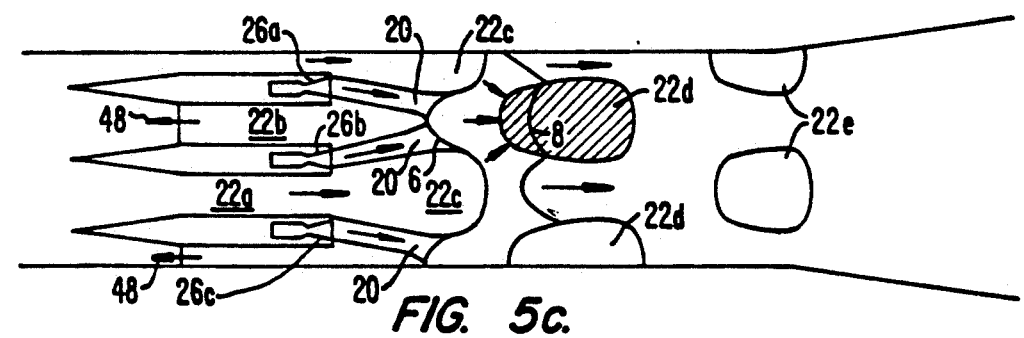
Figure 5D:
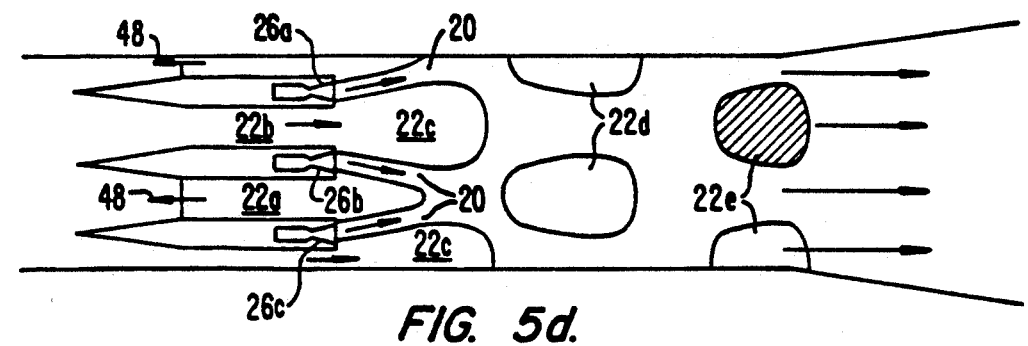

FIGS. 5a–d show an embodiment of the invention wherein multiple internal nozzles 26a, b, c, . . . n are oscillated to produce thrust augmentation in a single propulsion duct. With reference numerals denoting similar fluids and structure as in FIGS. 3 and 4, FIG. 5a shows a first "time-lapse frame" showing a slug of secondary air 22b (shaded) being compressed by the action of primary jets exhausting from rockets 26a and 26b being forced fluidically together by fluid injectors (not shown for clarity). Other pockets or bubbles of secondary fluid are shown at 22c, 22d, and 22e, respectively. As was explained with reference to FIG. 4 in the embodiment of the single nozzle internal to the propulsion duct, the secondary fluid 22b shown in FIG. 5a is first undergoing a compression before even coming in contact with the primary fluid, by virtue of the hammer shock 48 which occurs when primary fluid 20 from nozzles 26a and 26b are deflected together. In much the same manner as "water hammer" in water piping systems, the bubble of secondary fluid 22b shown in FIG. 5a is undergoing a sudden deceleration in its movement through the propulsion duct. In FIG. 5b, the primary fluids exiting from nozzles 26a and 26b are now switched, causing the bubble of secondary fluid to be accelerated and to undergo a decrease in pressure (as shown at shaded 22c). In FIG. 5c, the switching of primary fluid jets from nozzles 26a and 26b in FIG. 5b causes primary 6 and secondary shocks 8, resulting in secondary flow 22d being accelerated via direct contact with primary flow, and the primary flow being decelerated and compressed via direct contact with secondary flow. This not only causes an acceleration of the secondary fluid 22d, but a further compression equivalent to many times that of atmospheric. Finally, in FIG. 5d, the secondary fluid bubble 22e is shown at a velocity which approximates (within 5%) that of the conventional ejector ramjet exhaust velocity but at a pressure which ranges from about two times to about four times as high as that emanating from the conventional ejector ramjet, resulting in significant low-speed efficiency gains (as high as 30%) and the added benefit of high-speed mixing being possible.

The nozzles, fluid injectors, and fluids which operate the fluid injectors used in the internal oscillation embodiments of FIGS. 4 and 5, respectively, are essentially the same as those used in the external nozzle configuration embodiment as shown in FIG. 3. The propulsion duct length and shape is preferably rectangular to conform with air frame integration in current hypersonic vehicle designs.

As with the embodiment shown in FIG. 3, the frequency of oscillations of the primary fluid jets from rockets 26a, b, and c will generally depend upon the natural frequency of the upstream ducts, which increases with increased vehicle velocity. Depending on the dimensions and geometry of the vehicle, the frequency of primary jet oscillations ranges generally from about 1 Hertz to about 100 Hertz or more, depending on engine size. The most preferred frequency of oscillation is the natural tuning frequency of the upstream ducts, where the alternating separation of the primary jet fluid will be tuned to resonate with the hammer shock. The coordination and resonation of the fluidically driven fluid injectors with the hammer shock of the upstream duct may actually cause the ejector ramjet to be effectively self-driven, with only slight adjustment of the fluidically driven injectors to synchronize the operation of the multiple primary jets. A control scheme consisting of pressure taps on the inlet and outlet of the propulsion duct, both of which communicate with a programmable controller, controls the fluidic deflectors allowing the resonation that is desired to be achieved by the operator. Such control schemes are well known in the art and are commercially available.

Figure 6A:
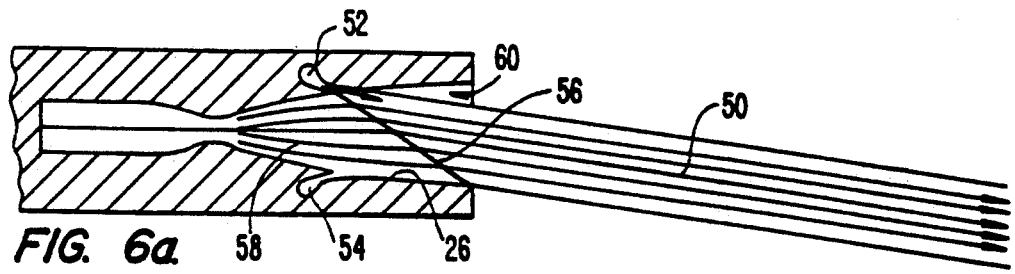
FIGS. 6a-e show schematically time-lapse views of how two fluid injectors may be used in the jet switching process.
Figure 6B:
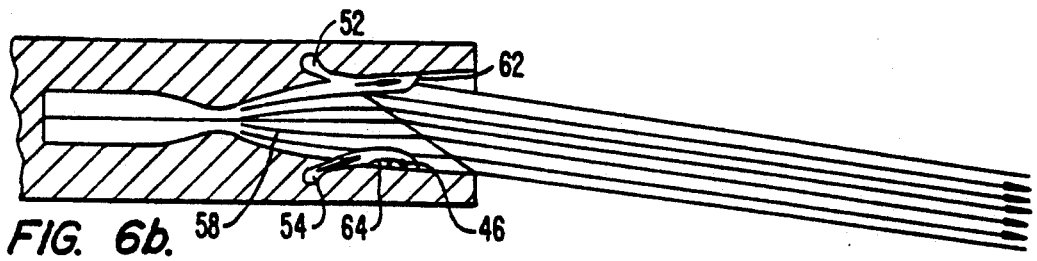
Figure 6C:
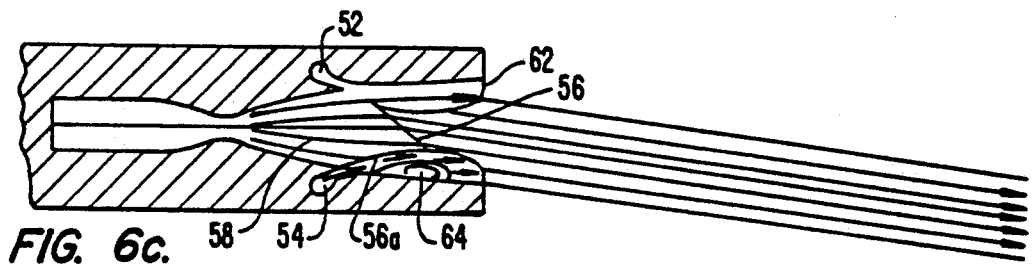
Figure 6D:
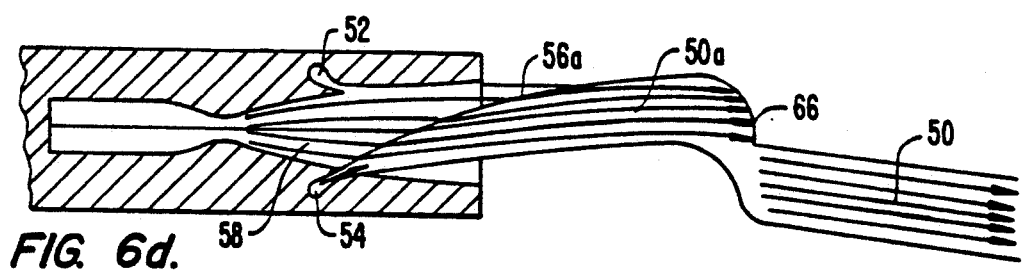
Figure 6E:
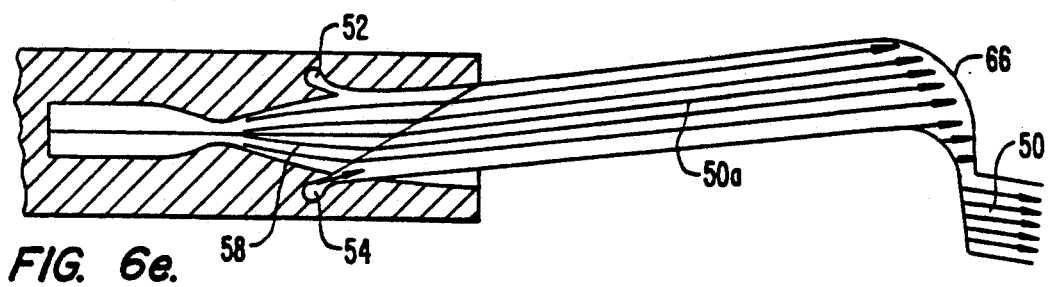

FIGS. 6a–e illustrate schematically the jet switching process with square wave control inputs. Each figure represents a time-lapse snap shot of the process at progressively different times. FIG. 6a shows a steady state deflected jet 50 at time zero. The "left" fluid injector 52 is shown flowing while the "right" fluid injector 54 is off, although it will be recognized by those skilled in the art that the situation could be reversed. Left fluid injector 52 generates an oblique shock 56 inside primary nozzle 26 which deflects jet 50 to the right, as shown by streamlines 58. Backpressure 60 helps maintain separation. In FIG. 6b, at time zero plus about 5 μsec, as controlled by the control logic, fluid injection by right fluid injector 54 has started on the opposite (right) side of nozzle 26, while left fluid injector 52 is deactivated. (The activation of one and deactivation of the other fluid injector need not be exactly simultaneous, but is assumed here.) As shown at 62, flow reattaches to the nozzle near left fluid injector 52, while a separation bubble 64 begins to form near right fluid injector 54. FIG. 6c shows flow reattaching at 62 and bubble 64 more fully developed at time zero plus about 10 μsec. At this time flow separation begins near the right side of nozzle 12, while a new oblique shock 56a begins to form and old shock 56 shrinks. At time zero plus about 25 μsec (FIG. 6d) new shock 56a has deflected the jet to form a new let 50a, with the old let 50 proceeding as at time zero. Also a surface 66 can now be seen forming, which is shown more fully developed at time zero plus 30 μsec in FIG. 6e, surface 66 being the surface which drives the secondary fluid, as explained above.

As explained in the Summary of the Invention, the thrust augmentation possible is dependent on tuning the process. The natural frequency of the upstream ducts, as well as the control of the alternate separations of the primary fluid in the primary nozzle will determine the actual percentage of thrust augmentation in the system. The length from the primary nozzle exit back to the divergent portion of the upstream ducts ("L" which as shown in FIG. 4) is illustrated as essentially corresponding to the length of each duct 37, 39 formed by the generally parallel portions of strut portion 33 and propulsion duct walls 32, 34 is very important. This length determines the natural frequency of the hammer waves and the primary jets may be tuned so that the two may resonate and produce the maximum thrust augmentation.

A variably tuned control process is an exemplary embodiment of the thrust fluid injection system since the tuning requirements of the upstream duct will change with vehicle velocity. Ideally, however, the process is passively tuned wherein the reflected hammer shock allows the system to be self-driven with only a fine tuning adjustment using the fluidic injection.

Although the forgoing invention has been described in detail for purposes of clarity in understanding, it will be obvious that certain modifications may be practiced within the scope of the appended claims. For example, it may be possible to use propulsion ducts other than rectangular cross section or indeed a mixture of rectangular and circular propulsion ducts. Various fluid means such as inert fluids (fluids not combustible), fuel additives or reactive fluids (oxidizers), may be used to separate the primary fluid jet from the nozzle sidewalls other than those previously mentioned. These and other variations are considered within the scope of the appended claims.

What is claimed is:

1. An ejector ramjet comprising:
a propulsion duct having an upstream portion and a downstream portion;
a nozzle being positioned within said propulsion duct for generating a primary fluid jet which induces a secondary fluid to flow from said upstream portion toward said downstream portion of said duct; and
first and second fluid injectors associated with said nozzle for alternately changing the angular direction of said primary fluid jet from first to second directions at a determined oscillation frequency.

2. The ejector ramjet of claim 1 further including a controller coupled to said fluid injectors for controlling activation of said injectors and the oscillation frequency of said primary jet.

3. The ejector ramjet of claim 2 further including a strut, said nozzle being positioned in said strut, said strut and a portion of said propulsion duct forming a second duct in the upstream portion of said propulsion duct, said controller being adjusted such that the oscillation frequency of the primary jet substantially corresponds to the natural tuning frequency of said second duct.

4. The ejector ramjet of claim 1 wherein said propulsion duct has a rectangular cross-section substantially along the length thereof.

5. The ejector ramjet of claim 1 wherein said ejector ramjet includes a plurality of said nozzles laterally spaced from one another and positioned within said propulsion duct, and controls for controlling the activation of the injectors such that when the primary jet exiting one nozzle is in said first direction, the primary jet exiting the nozzle adjacent said one nozzle is directed in said second direction.

6. An ejector ramjet comprising:
a propulsion duct having first and second wall portions;
a nozzle having first and second side portions, said nozzle being positioned in said propulsion duct and configured to generate a primary fluid jet and an entrained secondary fluid; and
means for oscillating said primary fluid jet between said first and second side portions of said nozzle to direct the primary jet and entrained secondary fluid to said first and second wall portions in alternating manner.

7. The ejector ramjet of claim 6 wherein said oscillating means comprises first and second fluid injectors.

8. The ejector ramjet of claim 6 further including a strut that forms said nozzle, said strut and a portion of said propulsion duct forming a second duct in the upstream portion of said propulsion duct, said ejector ramjet further including means for adjusting the frequency at which said oscillating means oscillates said primary fluid jet between said first and second side portions to correspond to the natural frequency of said second duct.

9. The ejector ramjet of claim 6 wherein said propulsion duct has a rectangular cross-section substantially along the cross-section thereof.

10. The ejector ramjet of claim 6 wherein said ramjet includes a plurality of said nozzles laterally spaced from one another and positioned in said propulsion duct, and means for controlling the oscillation means such that the primary jets generated by adjacent nozzles are directed toward different ones of said wall portions.

* * * * *